United States Patent
Andrews (10) Patent No.: US 11,850,889 B1
(45) Date of Patent: Dec. 26, 2023

(54) HUB CAP SYSTEMS AND METHODS FOR VEHICLE WHEELS

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 586 days.

(21) Appl. No.: 16/885,042

(22) Filed: May 27, 2020

Related U.S. Application Data (60) Provisional application No. 62/855,770, filed on May 31, 2019.

(51) Int. Cl.
| | |
|---|---|
| *B60B 7/14* | (2006.01) |
| *B60B 3/16* | (2006.01) |
| *B60B 7/06* | (2006.01) |
| *B60B 7/00* | (2006.01) |

(52) U.S. Cl.
CPC ............... *B60B 7/14* (2013.01); *B60B 3/16* (2013.01); *B60B 7/0013* (2013.01); *B60B 7/066* (2013.01)

(58) Field of Classification Search
CPC .......... B60B 7/14; B60B 3/16; B60B 7/0013; B60B 7/066
See application file for complete search history.

(56) References Cited

U.S. PATENT DOCUMENTS

| | | | | |
|---|---|---|---|---|
| 4,761,040 A | * | 8/1988 | Johnson | B60B 7/14 301/37.38 |
| 4,881,783 A | * | 11/1989 | Campbell | B60B 7/068 301/108.4 |
| D321,164 S | | 10/1991 | Gibson | |
| 5,096,263 A | * | 3/1992 | Wright | B60B 7/0053 301/37.375 |
| 5,358,313 A | * | 10/1994 | Polka | B60B 7/008 301/108.4 |
| D392,240 S | | 3/1998 | Kingsland | |
| D435,007 S | | 12/2000 | Moore | |
| D445,085 S | | 7/2001 | Herrera | |
| D450,290 S | | 11/2001 | Schardt | |
| D453,914 S | | 2/2002 | Dumigan | |
| D462,043 S | | 8/2002 | Choi | |
| D498,198 S | | 11/2004 | Buma | |
| D537,768 S | | 3/2007 | McMath | |
| D538,733 S | | 3/2007 | McMath | |
| D702,174 S | | 4/2014 | Gordon | |
| D741,246 S | | 10/2015 | Chung | |
| D751,022 S | | 3/2016 | Chung | |

(Continued)

FOREIGN PATENT DOCUMENTS

CA      211869 A      5/1921

*Primary Examiner* — Frank B Vanaman
(74) *Attorney, Agent, or Firm* — Schacht Law Office, Inc.; Michael R. Schacht (57) ABSTRACT

A wheel hub assembly adapted to be connected to a wheel assembly comprising a wheel rim defining a mounting portion comprises a retaining ring, a hub cap, and at least one retaining bolt. The retaining ring defines a first clamp portion. The hub cap defines a second clamp portion. The at least one retaining bolt is adapted to secure the hub cap relative to the retaining ring such that the mounting portion of the wheel rim is between the first clamp portion and the second clamp portion.

18 Claims, 9 Drawing Sheets

(56) References Cited

U.S. PATENT DOCUMENTS

| | | |
|---|---|---|
| D751,489 S | 3/2016 | Chung |
| D761,183 S | 7/2016 | Bennett et al. |
| D770,961 S | 11/2016 | Chan |
| D784,240 S | 4/2017 | Platto et al. |
| D793,325 S | 8/2017 | Platto et al. |
| D794,533 S | 8/2017 | Chung |
| D798,790 S | 10/2017 | Meyer |
| D803,137 S | 11/2017 | Platto et al. |
| D838,228 S | 1/2019 | Chung |
| D849,659 S | 5/2019 | Lee |
| D852,715 S | 7/2019 | Ash et al. |
| D860,105 S | 9/2019 | Moore et al. |
| D885,296 S | 5/2020 | Hale, Jr. |
| D949,082 S | 4/2022 | Jansen |
| D949,083 S | 4/2022 | Jansen |
| D949,084 S | 4/2022 | Jansen |
| 2004/0245847 A1* | 12/2004 | Hasegawa ................. B60B 3/16 301/37.33 |
| 2010/0194181 A1 | 8/2010 | Noriega |
| 2016/0207351 A1* | 7/2016 | Denmead ................. B60B 5/02 |
| 2018/0065408 A1* | 3/2018 | Wang ...................... B60B 7/04 |

\* cited by examiner

HUB CAP SYSTEMS AND METHODS FOR VEHICLE WHEELS

RELATED APPLICATIONS

This application, U.S. patent application Ser. No. 16/885,042, claims benefit of U.S. Provisional Application Ser. No. 62/855,770 filed May 31, 2019, the contents of which are incorporated herein by reference.

TECHNICAL FIELD

The present invention relates to hub caps for vehicle wheels and, more specifically, to systems and methods for detachably attaching hub caps to the wheels of off-road and all-terrain vehicles.

SUMMARY

The present invention may be embodied as a wheel hub assembly adapted to be connected to a wheel assembly comprising a wheel rim defining a mounting portion, the wheel hub assembly comprising a retaining ring, a hub cap, and at least one retaining bolt. The retaining ring defines a first clamp portion. The hub cap defines a second clamp portion. The at least one retaining bolt is adapted to secure the hub cap relative to the retaining ring such that the mounting portion of the wheel rim is between the first clamp portion and the second clamp portion.

The present invention may be embodied as a method of connecting a wheel hub assembly to a wheel assembly comprising a wheel rim defining a mounting portion comprising the following steps. A retaining ring defining a first clamp portion is provided. A second clamp portion is formed on a hub cap. At least one retaining bolt is arranged to secure the hub cap relative to the retaining ring such that the mounting portion of the wheel rim is between the first clamp portion and the second clamp portion.

The present invention may also be embodied as a wheel hub assembly adapted to be connected to a wheel assembly comprising a wheel rim defining a mounting portion, the wheel hub assembly comprising a retaining ring, a hub cap, a plurality of bolt through openings, a plurality of bolt threaded openings, and a plurality of retaining bolts. The retaining ring defines a first clamp portion. The hub cap defines a second clamp portion. The plurality of bolt through openings are defined by at least one of the retaining ring and the hub cap. The plurality of bolt threaded openings are defined by at least one of the retaining ring and the hub cap. Each retaining bolt is adapted to extend through one of the bolt through openings and engage one of the bolt threaded openings to secure the hub cap relative to the retaining ring such that the mounting portion of the wheel rim is between the first clamp portion and the second clamp portion.

DETAILED DESCRIPTION

Figure 1:
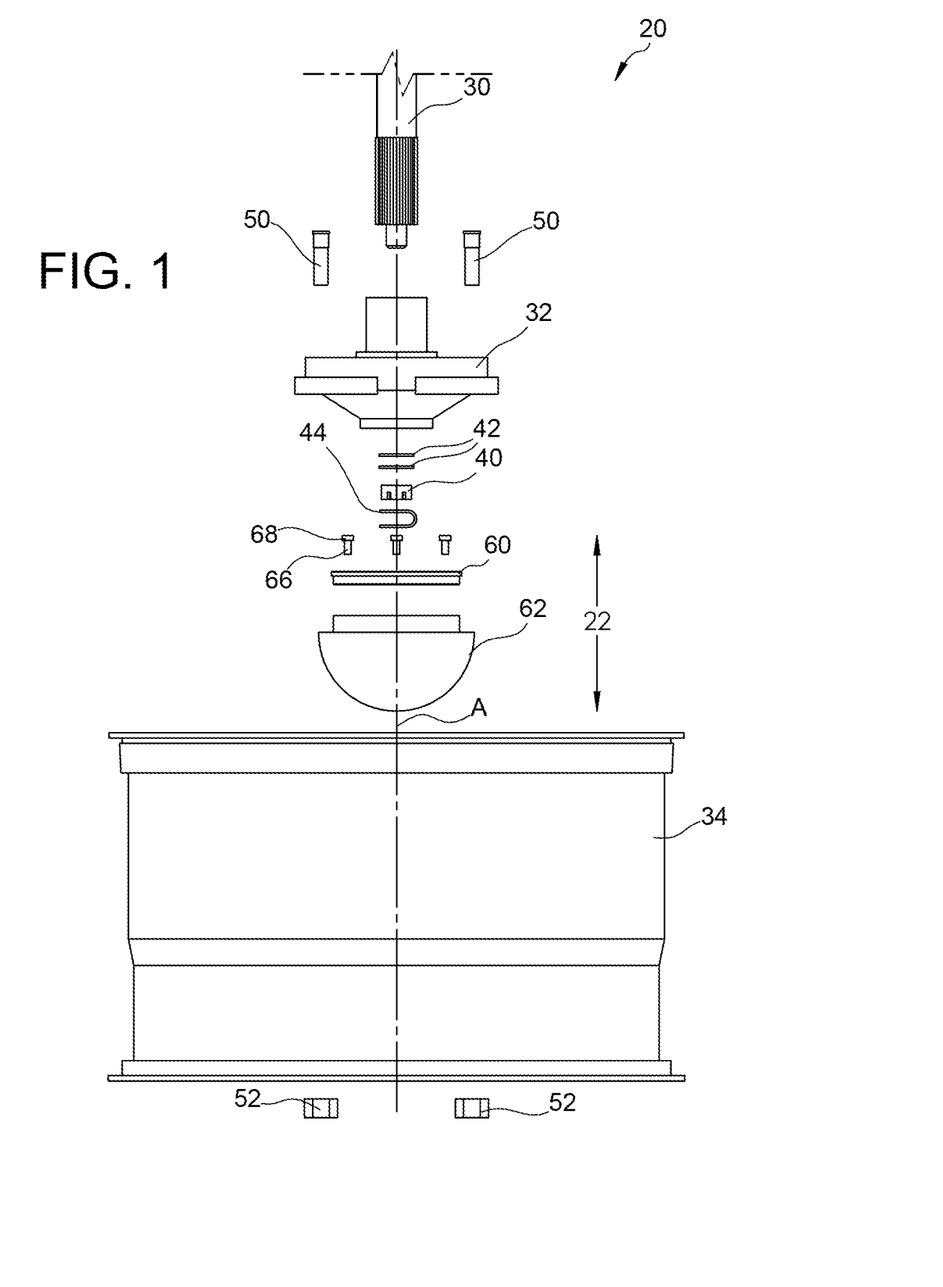
FIG. 1 is an exploded, top plan view of an example wheel assembly containing a first example hub cap system of the present invention.
Figure 2:
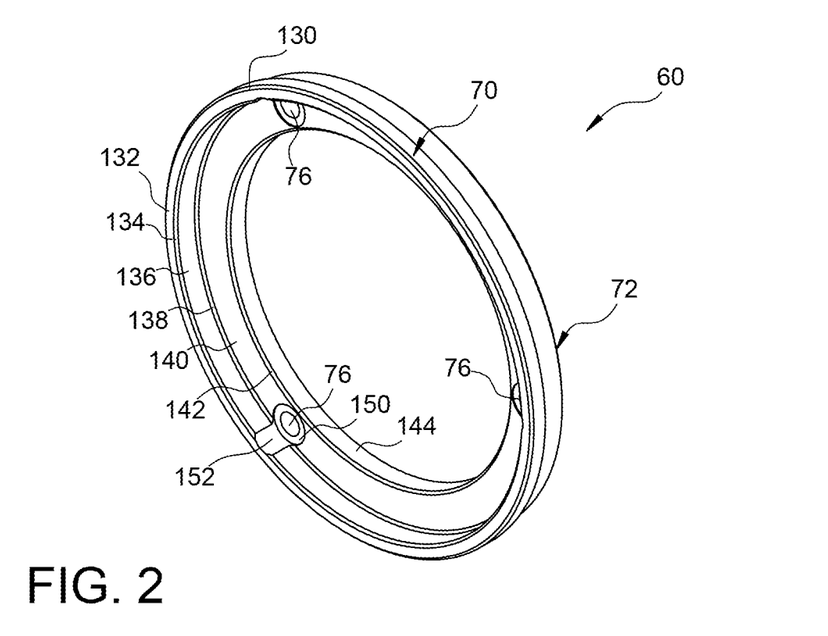
FIG. 2 is a perspective view of a first example retaining ring of the first example hub cap system of the present invention.
Figure 3:
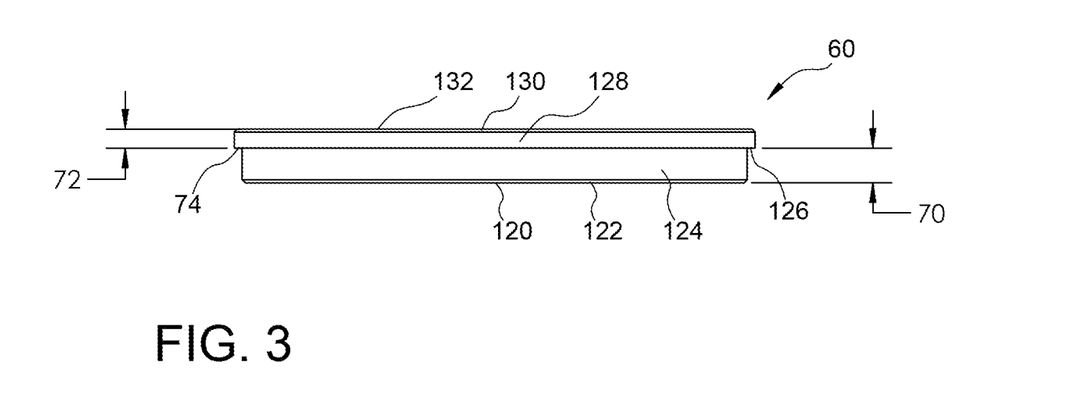
FIG. 3 is a top plan view of the first example retaining ring.
Figure 4:
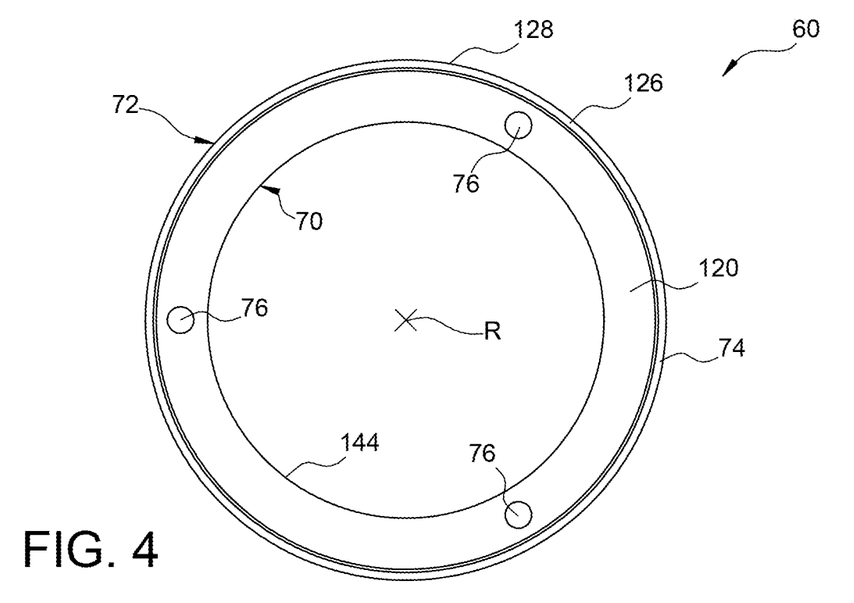
FIG. 4 is a front elevation view of the first example retaining ring.
Figure 5:
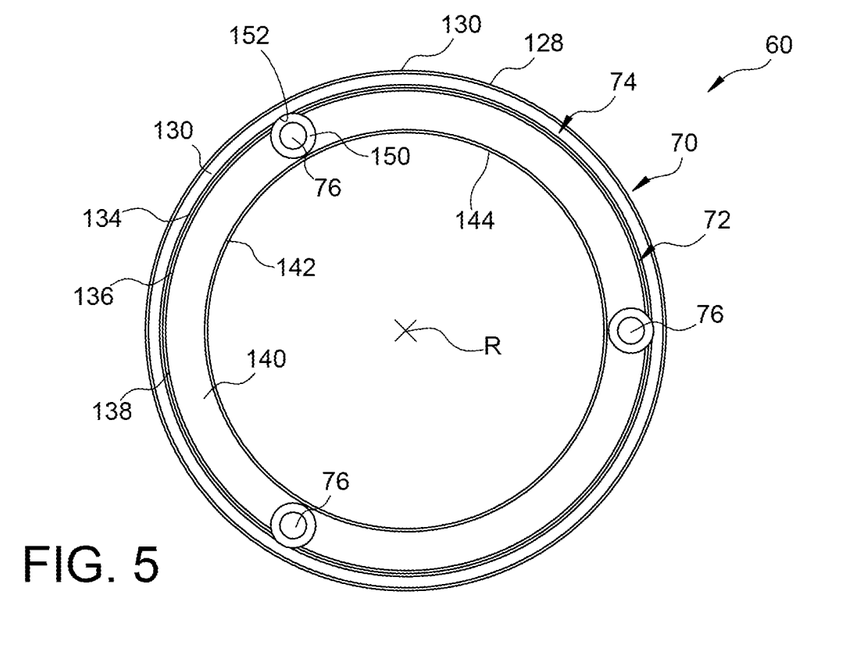
FIG. 5 is a rear elevation view of the first example retaining ring.
Figure 12:
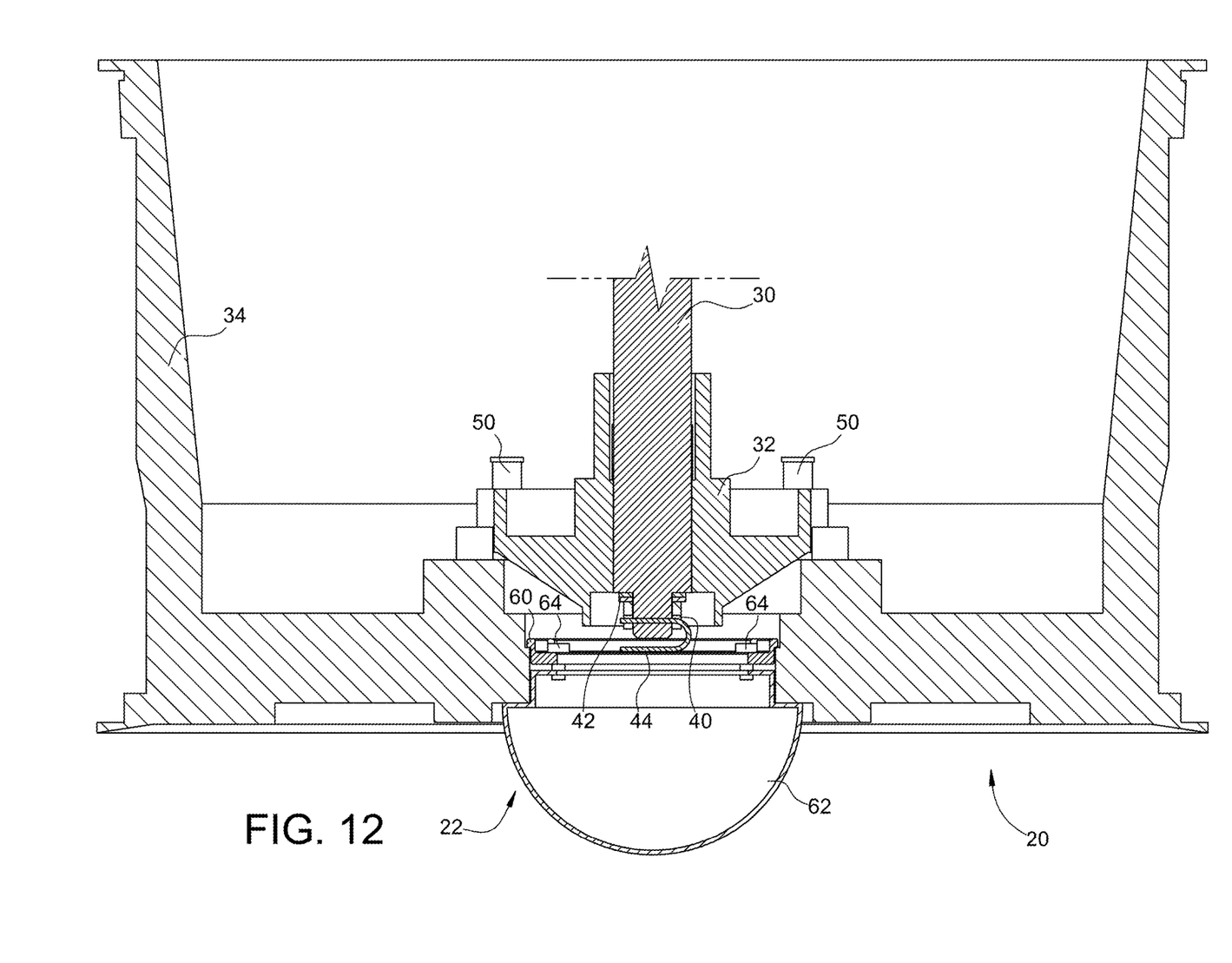
FIG. 12 is a section of the example wheel assembly and the first example hub cap system taken along lines 12-12 in FIG. 11.

Referring initially to FIG. 1 of the drawing, depicted therein is an example wheel assembly 20 incorporating a first example hub cap system 22 of the present invention. The example wheel assembly 20 is or may be conventional and will be described herein only to that extent helpful to a complete understanding of the present invention. FIGS. 1 and 12 illustrate that the example wheel assembly 20 comprises an axle 30, a hub 32, and a wheel rim 34. FIG. 1 further illustrates that the example wheel assembly 20 further comprises an axle nut 40, axle washers 42, a cotter pin 44, lug bolts 50, and lug nuts 52. In use, the hub 32 is connected to the axle 30 by the axle nut 40, axle washers 42, and cotter pin 44. The wheel rim 34 is then connected to the hub using the lug bolts 50 and lug nuts 52. A tire (not show) is normally supported by the wheel rim 34. So assembled, the axle 30, hub 432, and wheel rim 34 rotate in unison about an axis of rotation A defined by the axle 30.

Figure 6:
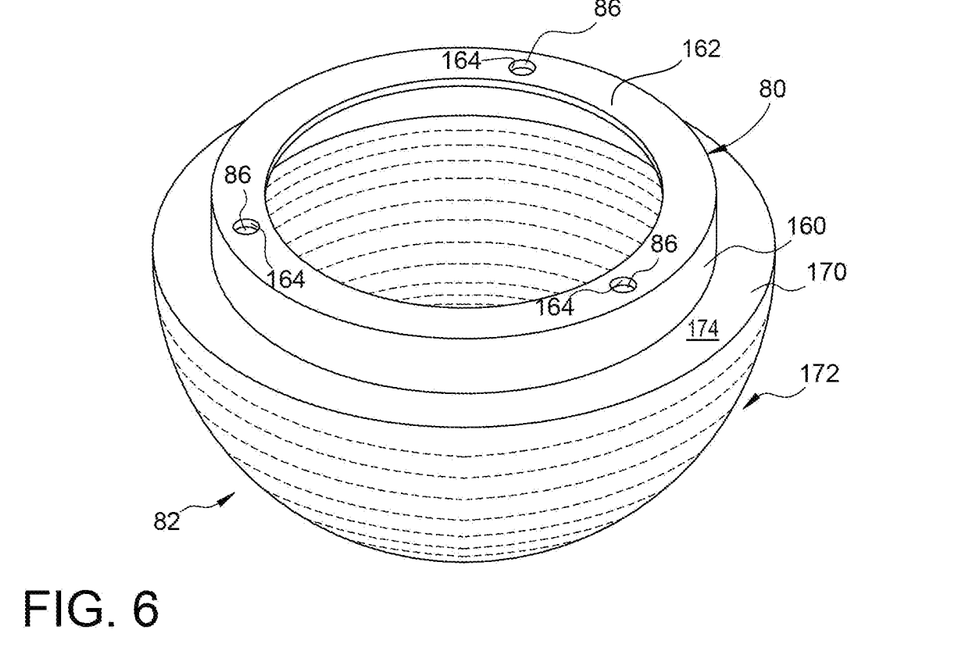
FIG. 6 is a perspective view of a first example hub of the first example hub cap system of the present invention.
Figure 7:
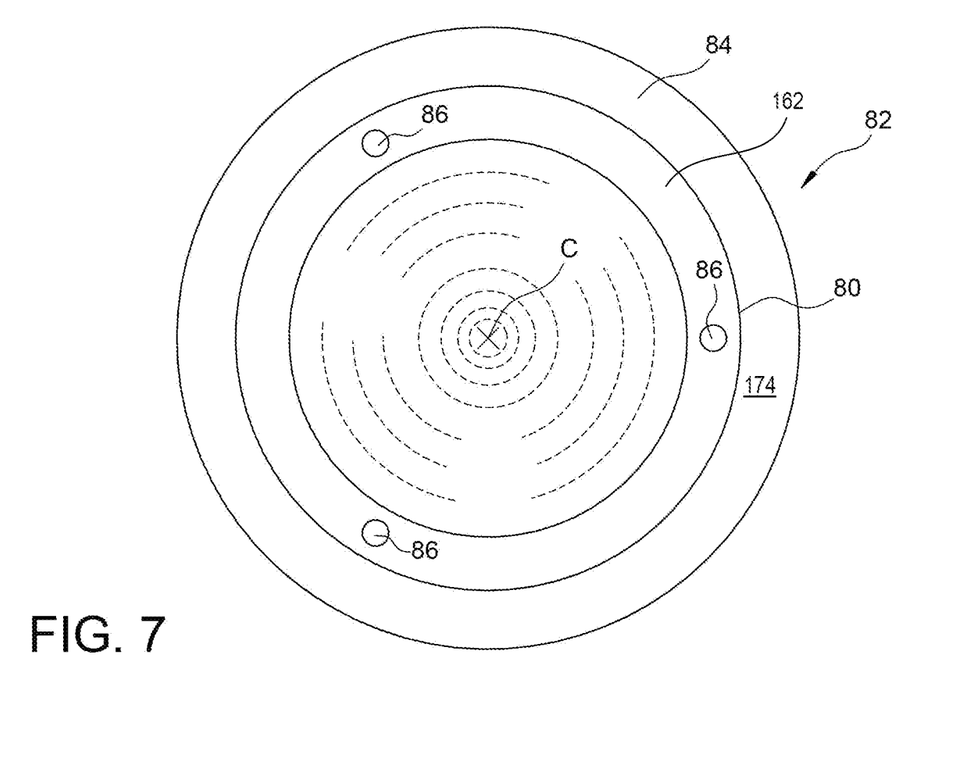
FIG. 7 is a rear elevation view of the first example hub.
Figure 8:
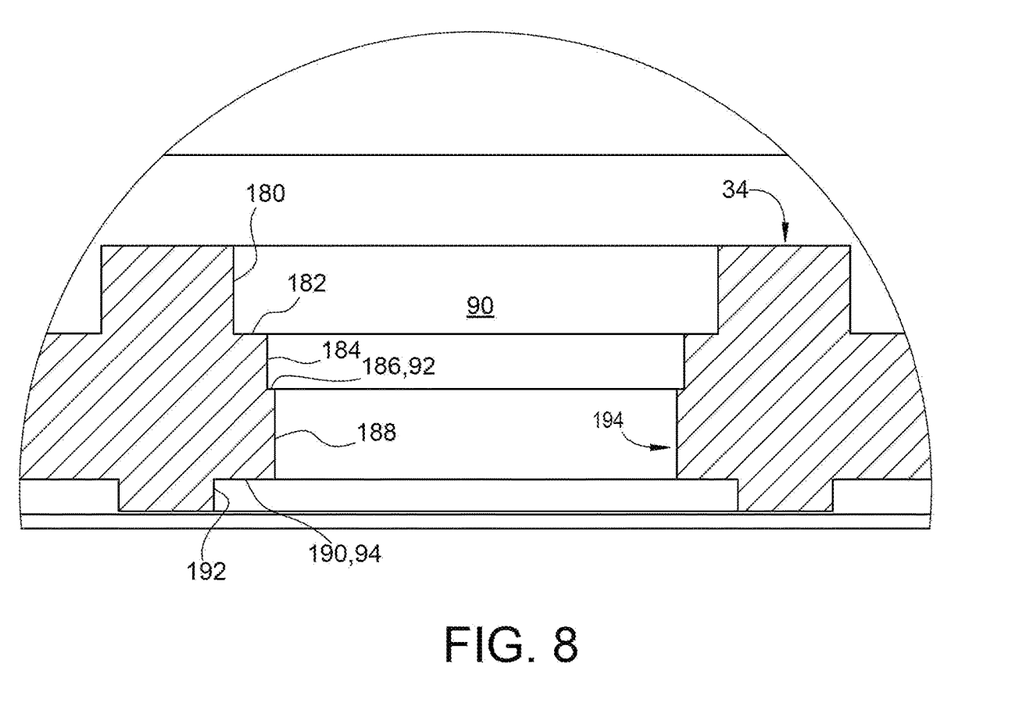
FIG. 8 is a section view of a portion of an example wheel rim of the example wheel assembly.
Figure 9:
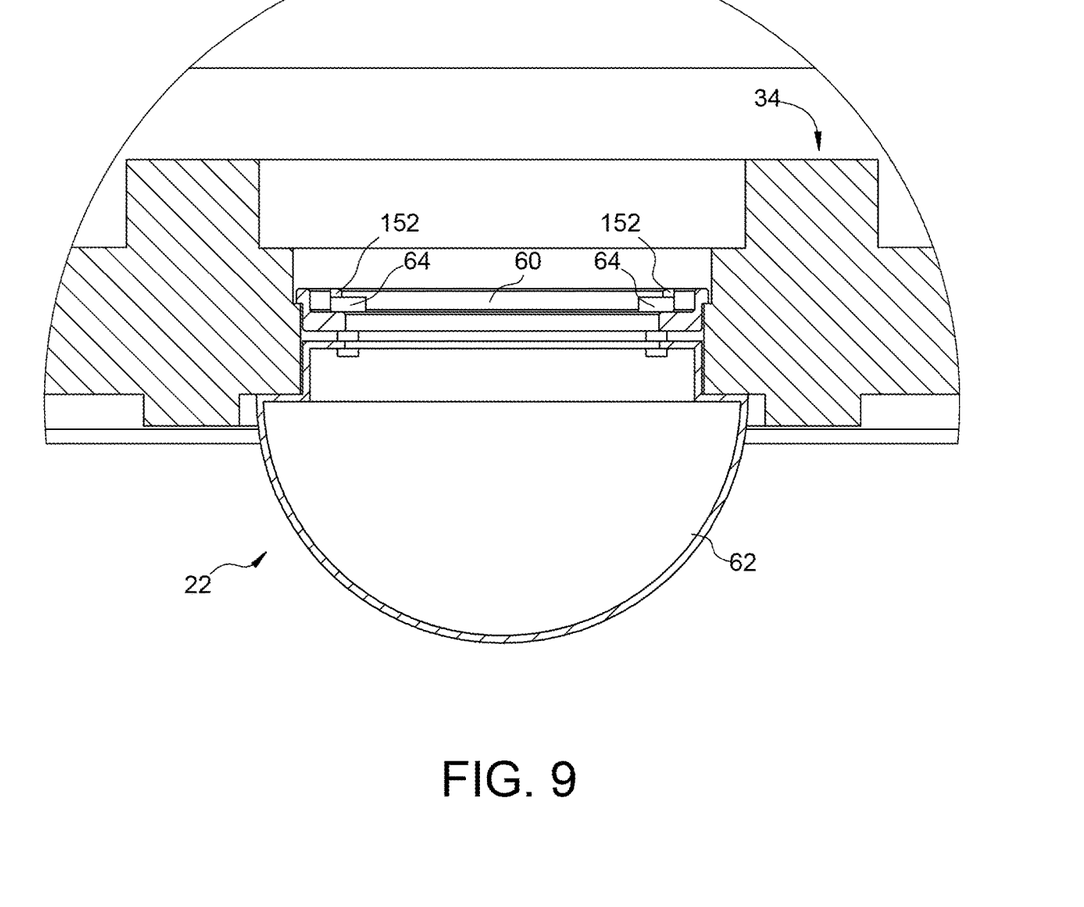
FIG. 9 is a section view of the first example hub cap assembly connected to the example wheel rim.

FIG. 1 also shows that the first example hub cap system 22 comprises a first example retaining ring 60, a first example hub cap 62, and example retaining bolts 64. Each retaining bolt 64 conventionally defines a threaded shaft 66 and a bolt head 68. FIGS. 2-5 illustrate that the example retaining ring 60 defines a ring proximal portion 70, a ring distal portion 72, a first clamp portion 74, and ring openings 76. FIGS. 6 and 7 illustrate that the example hub cap defines a cap proximal portion 80, a cap distal portion 82, a clamp portion 84 and hub openings 86. FIG. 8 illustrates that the example wheel rim 34 defines a through opening 90 and first and second engaging portions 92 and 94. As shown in FIG. 9, the first example hub cap system 22 is detachably attached to the wheel rim 34 by arranging the first clamp portion 74 to engage the first engaging portion 92 and the second clamp portion 84 to engage the second engaging portion 94. The retaining bolts 64 are then inserted through the ring openings 76 and into or through the hub openings 86 such that rotation of the retaining bolts 86 causes a portion of the example wheel rim 34 to be clamped between the first and second clamp portions 74 and 84.

With the foregoing general understanding of the construction and operation of the present invention in mind, the details of the first example hub cap system 22 will now be described in further detail.

The first example retaining ring 60 is substantially symmetrical about a ring axis R extending through the center of the first example retaining ring 60. The first example retaining ring 60 defines a first inner annular surface 120, a first beveled surface 122, a first outer cylindrical surface 124, a second inner annular surface 126, a second outer cylindrical surface 128, a second beveled surface 130, a first outer annular surface 132, a third beveled surface 134, a first inner cylindrical surface 136, a fourth beveled surface 138, a second outer annular surface 140, a fifth beveled surface 142, and a second inner annular surface 144. Each of the ring openings 76 defines a bolt head recess 150 formed in the second outer annular surface 140. In addition, associated with each of the ring openings 76 is a bolt head notch 152 formed in the first inner cylindrical surface 136. In the first example retaining ring 60, the first clamp portion 74 is defined by the second inner annular surface 126.

For ease of manufacture, balanced rotation during use, and secure attachment of the first example retaining ring 60 to the wheel rim 34, the first example retaining ring 60 is comprised of substantially cylindrical and annular surfaces: the ring cylindrical surfaces are substantially parallel to the ring axis R, while the ring annular surfaces are substantially orthogonal to the ring axis R. The beveled surfaces of the first example retaining ring 60 are at substantially a 45 degree angle relative to the ring axis R. Further, the first example retaining ring 60 defines three of the ring openings 76 spaced at 120 degrees increments on the ring 60 about the ring axis R. However, the number of ring openings and the exact angular relationship of many of the ring surfaces and of the ring openings relative to the ring axis R is not critical so long as, overall, the first example retaining ring 60 is substantially balanced for rotation about the ring axis R.

As shown in FIGS. 6 and 7, the first example hub cap 62 is substantially symmetrical about a cap axis C extending through the center of the first hub cap 62. The example hub proximal portion 80 of the example hub cap 62 comprises an extension portion 160 and a flange portion 162. The example hub openings 86 are spaced at 120 degrees increments on the flange portion 162 about the cap axis C, and the example threaded surfaces 164 defining the hub openings 86 are formed in the flange portion 162. The example hub distal portion 82 of the example hub cap 62 comprises a bridge portion 170 and an exposed portion 172. The example bridge portion 170 defines a bridge surface 174 that forms the second clamp portion 84 defined by the first example hub cap 62. The example extension portion 160 of the first example hub cap 62 is substantially parallel to the cap axis C, while the example flange portion 162 and the bridge surface 174 are substantially perpendicular to the cap axis C. The example exposed portion 172 is semi-spherical but typically takes any one of a number of different sizes, shapes, and configurations to provide a desired aesthetic look to the example wheel assembly 22.

While not per se part of the present invention, wheel rims such as the example wheel rim 34 have certain structural characteristics, and the first example hub cap system 22 is adapted to fit those structural characteristics. In particular, as shown in FIG. 8, the example wheel rim 34 defines a first inner surface 180, a first radial surface 182, a second inner surface 184, a second radial surface 186, a third inner surface 188, a third radial surface 190, and a fourth inner surfaces 192. The second radial surface 186 defines the first engaging portion 92 of the wheel rim 34, while the third radial surface 190 defines the second engaging portion 94 of the wheel rim 34. A mounting portion 194 of the wheel rim 34 is defined between the second radial surface 186 and the third radial surface 190.

Figure 10:
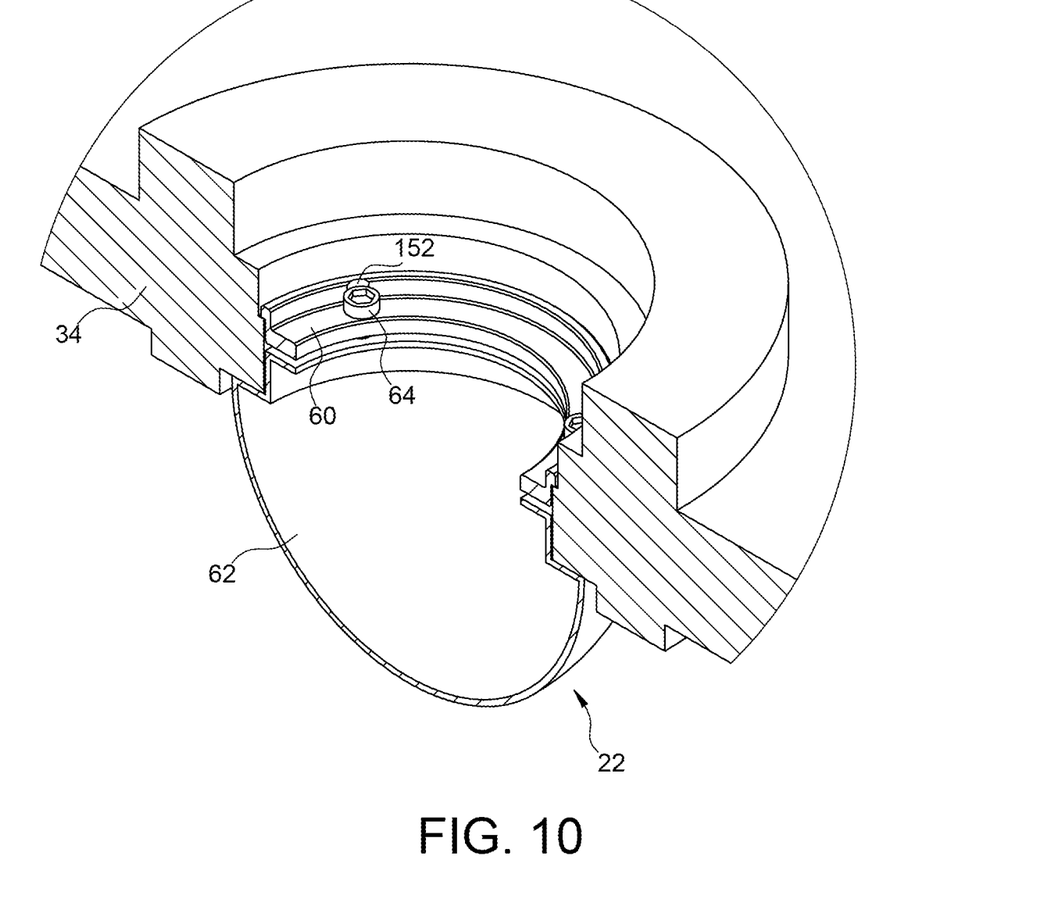
FIG. 10 is an enlarged view of a portion of FIG. 9.

The example retaining ring 60 and hub proximal portion 80 form a connecting system that detachably attaches the example hub cap 62 to the wheel rim 34. In particular, as perhaps best shown in FIG. 9, the threaded shafts 66 of the example retaining bolts 64 extend through the ring openings 76 and engage the threaded surfaces 164 defining the hub openings 86 such that rotation of the retaining bolts 64 displaces the retaining ring 60 and hub cap 62 towards each other until the second inner annular surface 126 of the retaining ring 60 engage the second radial surface 186 of the wheel rim 34 and the bridge surface 174 of the hub cap 62 engages the third radial surface 190 of the wheel rim 34. Continued tightening of the retaining bolts 64 securely clamps mounting portion 194 of the wheel rim between the retaining ring 60 and the hub cap 62. As shown in FIG. 10, the bolt heads 68 of the retaining bolts 64 are received in the bolt head recesses 150 of the ring openings 76. The bolt head notches 152 allow the bolt heads 68 to enter the bolt head recesses 150. The retaining ring 60 and hub 62 are thus secured to the wheel rim 34 by the retaining bolts 64 to form the first example hub cap system 22 of the present invention.

Figure 11:
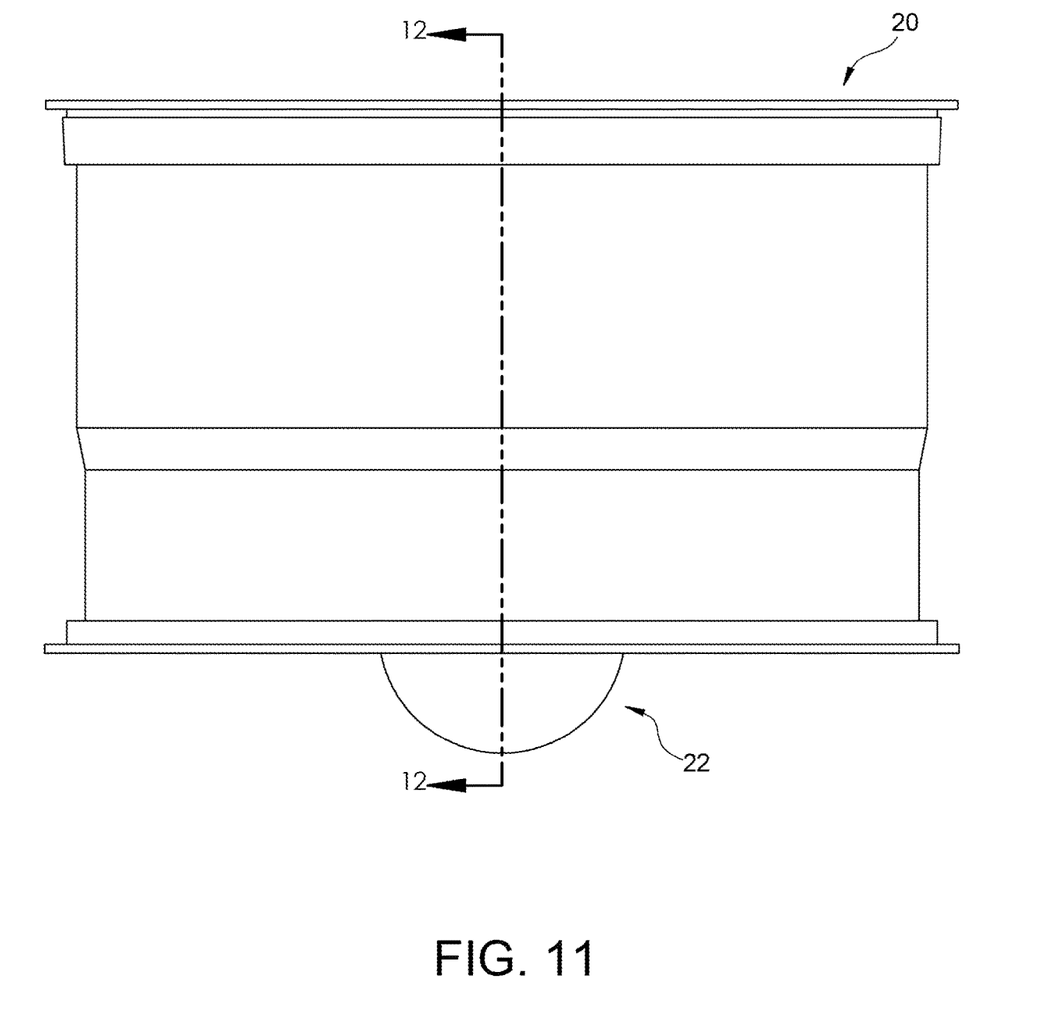
FIG. 11 is a top plan view of the wheel assembly containing the first example hub cap system.

With the first example hub cap system 22 secured to the wheel rim 34 as shown in FIG. 9, the combination of the hub cap system 22 and the wheel rim 34 is then connected to the hub 32, as generally shown in FIGS. 11 and 12, using the lug bolts 50 (not visible in FIG. 11) and lug nuts 52 (not visible in FIGS. 11 and 12).

The example hub cap system 22 of the present invention securely attaches the hub cap 62 relative to the wheel rim 34 during normal operation of the example wheel assembly 20. However, the first example hub cap system 22 allows the hub cap 62 to be replaced with another hub cap of the same or different configuration using tools and procedures similar to those of changing a tire.

What is claimed is:

1. A hub cap assembly for covering an axle and hub, where at least a portion of the hub is arranged within a wheel through opening of a wheel rim defining a mounting portion, the hub cap assembly comprising:
    a retaining ring defining a first clamp portion;
    a hub cap defining a second clamp portion; and
    at least one retaining bolt adapted to secure the hub cap relative to the retaining ring such that the mounting portion of the wheel rim is clamped between the first clamp portion and the second clamp portion; wherein
    with the retaining ring arranged relative to the hub cap such that the mounting portion of the wheel rim is clamped between the first clamp portion and the second clamp portion, at least a portion of each retaining bolt lies within the through opening of the wheel rim.

2. A hub cap assembly as recited in claim 1, in which:
    at least one of the retaining ring and the hub cap defines at least one bolt through opening; and
    at least one of the retaining ring and the hub cap defines at least one bolt threaded opening; whereby
    the at least one retaining bolt is arranged to extend through the at least one bolt through opening and engage the bolt threaded opening to apply a clamp force to the retaining ring and the hub cap such that the mounting portion of the wheel rim is clamped between the first clamp portion and the second clamp portion.

3. A hub cap assembly as recited in claim 1, in which:
    the retaining ring defines at least one bolt through opening; and
    the hub cap defines at least one bolt threaded opening; whereby
    the at least one retaining bolt is arranged to extend through the at least one bolt through opening and engage the at least one bolt threaded opening to apply a clamp force to the retaining ring and the hub cap such that the mounting portion of the wheel rim is clamped between the first clamp portion and the second clamp portion.

4. A hub cap assembly as recited in claim 1, in which:
the retaining ring defines a plurality of bolt through openings; and
the hub cap defines a plurality of bolt threaded openings; whereby
each retaining bolt is arranged to extend through the one of the plurality of bolt through openings and engage one of the plurality of bolt threaded openings such that a clamp force is applied to the retaining ring and the hub cap to clamp the mounting portion of the wheel rim between the first clamp portion and the second clamp portion.

5. A method of connecting a hub cap assembly to a wheel assembly comprising a wheel rim defining a mounting portion and a wheel through opening, where at least a portion of a wheel hub is within the wheel through opening, the method comprising the steps of:
providing a retaining ring defining a first clamp portion;
forming a second clamp portion on a hub cap; and
arranging at least one retaining bolt to secure the hub cap relative to the retaining ring such that
the mounting portion of the wheel rim is clamped between the first clamp portion and the second clamp portion, and
with the retaining ring arranged relative to the hub cap such that the mounting portion of the wheel rim is clamped between the first clamp portion and the second clamp portion, at least a portion of each retaining bolt lies within the through opening of the wheel assembly.

6. A method as recited in claim 5, in which the wheel rim defines a first inner surface, a first radial surface, a second inner surface, a second radial surface, a third inner surface, and a third radial surface, where the mounting portion of the wheel rim is defined between the second radial surface and the third radial surface, the method further comprising the steps of:
sizing and dimensioning the first clamp portion defined by the retaining ring to engage the second radial surface of the wheel rim to prevent passage of the retaining ring through the wheel through opening; and
sizing and dimensioning the second clamp portion defined by the hub cap to engage the third radial surface of the wheel rim to prevent passage of the hub cap through the wheel through opening.

7. A method as recited in claim 5, in which the wheel rim defines first inner surface, a first radial surface, a second inner surface, a second radial surface, a third inner surface, and a third radial surface, where the mounting portion of the wheel rim is defined between the second radial surface and the third radial surface, the method further comprising the steps of:
providing a ring proximal portion of the retaining ring to define the first clamp portion, where the ring proximal portion is sized and dimensioned to prevent passage of the retaining ring through the wheel through opening; and
sizing and dimensioning a ring distal portion of the retaining ring to fit within at least a portion of the wheel through opening defined by the third inner surface of the wheel rim.

8. A method as recited in claim 7, further comprising the steps of:
forming the second clamp portion on a hub distal portion of the hub cap, where the hub distal portion is sized and dimensioned to prevent passage of the hub cap through the wheel through opening; and
sizing and dimensioning a hub proximal portion of the hub cap to fit within at least a portion of the wheel through opening defined by the third inner surface of the wheel rim.

9. A method as recited in claim 8, in which:
at least one of the ring proximal portion of the retaining ring and cap distal portion of the hub cap defines at least one bolt through opening; and
at least one of the ring proximal portion of the retaining ring and cap distal portion of the hub cap defines at least one bolt threaded opening; whereby
the at least one retaining bolt is arranged to extend through the at least one wheel through opening and engage the bolt threaded opening to apply a clamp force to the retaining ring and the hub cap such that the mounting portion of the wheel rim is clamped between the first clamp portion and the second clamp portion.

10. A wheel hub assembly adapted to be connected to a wheel assembly comprising a wheel rim defining a mounting portion and a through opening, the wheel hub assembly comprising:
a retaining ring defining a first clamp portion;
a hub cap defining a second clamp portion;
a plurality of bolt through openings defined by at least one of the retaining ring and the hub cap;
a plurality of bolt threaded openings defined by at least one of the retaining ring and the hub cap; and
a plurality of retaining bolts, where
each retaining bolt is adapted to extend through one of the bolt through openings and engage one of the bolt threaded openings to secure the hub cap relative to the retaining ring such that the mounting portion of the wheel rim is clamped between the first clamp portion and the second clamp portion, and
with the retaining ring arranged relative to the hub cap such that the mounting portion of the wheel rim is clamped between the first clamp portion and the second clamp portion, at least a portion of each retaining bolt lies within the through opening of the wheel assembly.

11. A wheel hub assembly as recited in claim 10, in which the wheel rim defines a first inner surface, a first radial surface, a second inner surface, a second radial surface, a third inner surface, and a third radial surface, where the mounting portion of the wheel rim is defined between the second radial surface and the third radial surface, wherein:
the first clamp portion defined by the retaining ring is sized and dimensioned to engage the second radial surface of the wheel rim to prevent passage of the retaining ring through the wheel through opening; and
the second clamp portion defined by the hub cap is sized and dimensioned to engage the third radial surface of the wheel rim to prevent passage of the hub cap through the wheel through opening.

12. A wheel hub assembly as recited in claim 11, in which:
the first clamp portion is defined by a ring proximal portion of the retaining ring, where the ring proximal portion is sized and dimensioned to to prevent passage of the retaining ring through the wheel through opening; and
a ring distal portion of the retaining ring is sized and dimensioned to fit within at least a portion of the wheel through opening defined by the third inner surface of the wheel rim.

13. A wheel hub assembly as recited in claim 11, wherein:
the second clamp portion is defined by a hub distal portion of the hub cap, where the hub distal portion is sized and dimensioned to prevent passage of the hub cap through the wheel through opening; and a hub proximal portion of the hub cap is sized and dimensioned to fit within at least a portion of the wheel through opening defined by the third inner surface of the wheel rim.

14. A hub cap assembly for covering an axle and hub, where at least a portion of the hub is arranged within a wheel through opening of a wheel rim defining a first inner surface, a first radial surface, a second inner surface, a second radial surface, a third inner surface, a third radial surface, and a mounting portion defined between the second radial surface and the third radial surface, the hub cap assembly comprising:

a retaining ring defining a first clamp portion;

a hub cap defining a second clamp portion; and at least one retaining bolt adapted to secure the hub cap relative to the retaining ring such that the mounting portion of the wheel rim is clamped between the first clamp portion and the second clamp portion; wherein with the retaining ring arranged relative to the hub cap such that the mounting portion of the wheel rim is clamped between the first clamp portion and the second clamp portion, at least a portion of each retaining bolt lies within the through opening of the wheel rim;

the first clamp portion defined by the retaining ring is sized and dimensioned to engage the second radial surface of the wheel rim to prevent passage of the retaining ring through the wheel through opening; and the second clamp portion defined by the hub cap is sized and dimensioned to engage the third radial surface of the wheel rim to prevent passage of the hub cap through the wheel through opening.

15. A hub cap assembly as recited in claim 14, in which:

the first clamp portion is defined by a ring proximal portion of the retaining ring, where the ring proximal portion is sized and dimensioned to prevent passage of the retaining ring through the wheel through opening; and a ring distal portion of the retaining ring is sized and dimensioned to fit within at least a portion of the wheel through opening defined by the third inner surface of the wheel rim.

16. A hub cap assembly as recited in claim 15, in which:

the second clamp portion is defined by a hub distal portion of the hub cap, where the hub distal portion is sized and dimensioned to prevent passage of the hub cap through the wheel through opening; and a hub proximal portion of the hub cap is sized and dimensioned to fit within at least a portion of the wheel through opening defined by the third inner surface of the wheel rim.

17. A hub cap assembly as recited in claim 15, in which:

at least one of the ring proximal portion of the retaining ring and cap distal portion of the hub cap defines at least one bolt through opening; and at least one of the ring proximal portion of the retaining ring and cap distal portion of the hub cap defines at least one bolt threaded opening; whereby the at least one retaining bolt is arranged to extend through the at least one wheel through opening and engage the bolt threaded opening to apply a clamp force to the retaining ring and the hub cap such that the mounting portion of the wheel rim is clamped between the first clamp portion and the second clamp portion.

18. A hub cap assembly as recited in claim 14, in which:

the second clamp portion is defined by a hub distal portion of the hub cap, where the hub distal portion is sized and dimensioned to prevent passage of the hub cap through the wheel through opening; and a hub proximal portion of the hub cap is sized and dimensioned to fit within at least a portion of the wheel through opening defined by the third inner surface of the wheel rim.

\* \* \* \* \*